Jan. 8, 1963  HENRI-GEORGES DOLL  3,072,844
ELECTRICAL MEASURING SYSTEMS
Filed Oct. 14, 1958  2 Sheets-Sheet 1

Henri-Georges Doll
INVENTOR.

BY William R. Sherman

ATTORNEY

Jan. 8, 1963 HENRI-GEORGES DOLL 3,072,844
ELECTRICAL MEASURING SYSTEMS
Filed Oct. 14, 1958 2 Sheets-Sheet 2

Henri-Georges Doll
INVENTOR.

BY *William R. Sherman*

ATTORNEY

United States Patent Office 3,072,844
Patented Jan. 8, 1963

3,072,844
ELECTRICAL MEASURING SYSTEMS
Henri-Georges Doll, Ridgefield, Conn., assignor to Schlumberger Well Surveying Corporation, Houston, Tex., a corporation of Texas
Filed Oct. 14, 1958, Ser. No. 767,136
8 Claims. (Cl. 324—54)

This invention relates to electrical measuring systems and, more particularly, to systems for measuring the dielectric constant of substances which may have an appreciable conductivity.

A variety of methods are known for measuring the dielectric constant of non-conductive materials. Such methods generally suffer inaccuracies, however, when the material undergoing measurement has an appreciable conductivity. The measurement of the dielectric constant of substances such as water-in-oil emulsions, for example, has been difficult to achieve with accuracy because the conduction current through the test cell exceeds the displacement current and affects the indications obtained.

In an attempt to overcome this difficulty, measurements have been made at megacycle frequencies. However, other disadvantages arise with the use of very high frequencies which offset the advantage of emphasizing the displacement current. These difficulties have led to a compromise in the accuracy which has been obtained.

It is an object of the present invention to provide new and improved systems whereby accurate measurements of dielectric constant are achieved without requiring resort to megacycle frequencies.

Another object of the present invention is to provide new and improved systems for measuring dielectric constant, wherein the effect of any conductive current flowing in the test cell is minimized.

A further object of the invention is to provide new and improved systems of the foregoing character which are relatively simple, highly reliable, and provide a high degree of accuracy under widely varying conditions.

In accordance with the invention, the substance undergoing measurement of its dielectric constant is received in a test cell forming a test capacitor of variable value. To derive indications of the capacitance of the test cell which are representative of the dielectric constant of the substance, a variable capacitor is provided having an adjustable capacitance value. Any error arising from a conductive component of current flowing through the substance is minimized by connecting capacitive means of high value in parallel with each of the test cell and variable capacitor. The test cell and the variable capacitor are each connected with a source of alternating current. In response to the resulting potentials across the test cell and the variable capacitor, the variable capacitor is adjusted by an amount corresponding with variations in the test cell capacitance to provide a measure of changes in the dielectric constant of the substance within the test cell.

In one embodiment of the invention, separate fixed capacitors are connected in parallel, respectively, with the test cell and the variable capacitor, and a source of substantially constant current is connected alternately with the test cell and the variable capacitor. In another embodiment, substantially equal currents from a source are supplied simultaneously to the test cell and to the variable capacitor, and the resulting potentials are alternately picked up to control the adjustment of the variable capacitor. A single fixed capacitor is arranged, in another embodiment, for alternate connection in parallel with the test cell and the variable capacitor. Adjustment of the variable capacitor is made in response to the potential developed across the fixed capacitor modulated in accordance with its alternate connections. In yet another embodiment, separate fixed capacitors are connected in parallel, respectively, with the test cell and the variable capacitor, in addition to the fixed capacitor which is connected alternately in parallel with the test cell and variable capacitor.

The invention will be better understood from the following detailed description of representative embodiments thereof taken in conjunction with the accompanying drawings, wherein.

Figure 1:
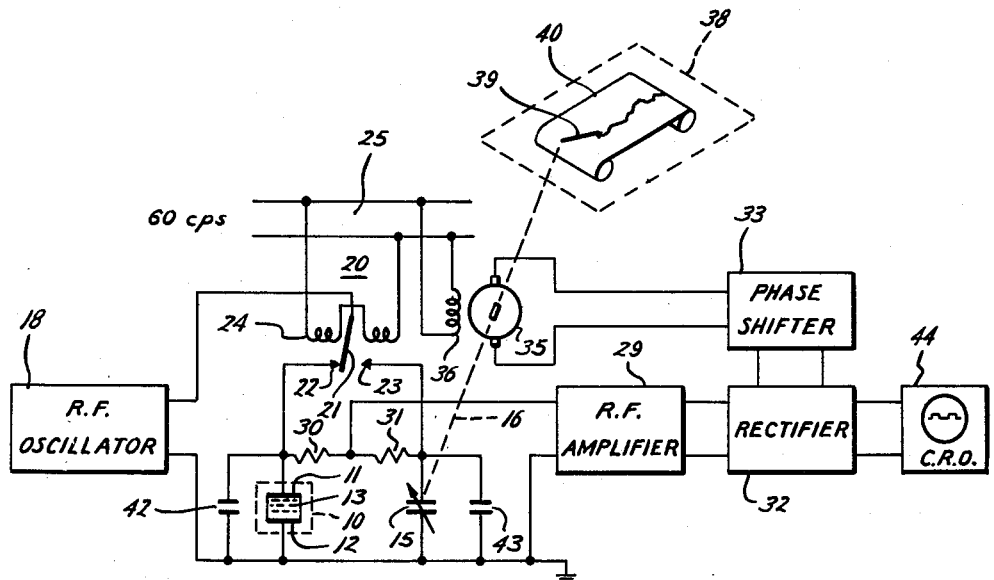
FIG. 1 is a schematic diagram of a system for measuring dielectric constant in accordance with the invention.

In FIG. 1 is shown a test cell 10 represented schematically as a capacitor formed by electrodes 11 and 12 spaced apart to receive a substance 13 to be tested. The test cell may have a variety of arrangements including various electrode configurations, whereby the capacitance measured between the electrodes varies with the dielectric constant of the substance 13 received therebetween. In order to obtain a measure of the value of dielectric constant which the material 13 may have, there is provided a variable reference capacitor 15 having a capacitance which may be adjusted, as by means of a drive connection 16.

The test cell 10 and the variable capacitor 15 are alternately supplied with a current from an alternating current source 18, such as a radio frequency oscillator, by connection across its terminals through a suitable switch 20. The switch 20 may conveniently be of electronic or other type. As illustrated, it may be a mechanical vibrator-type employing a movable contact 21 alternately making and breaking with fixed contacts 22 and 23 due to energization of a solenoid 24 by a suitable source, such as an A.C. power line 25. Where the movable contact 21 is connected with a terminal of oscillator 18, fixed contacts 22 and 23 are connected with the respective ungrounded terminals of test cell 10 and variable capacitor 15. The frequency of the voltage on line 25 may, for example, be a standard 60 cycles per second. So that equal currents will be supplied to the test cell and to the variable capacitor, the oscillator 18 is conveniently of the type having a high impedance output, and the current supplied by it is, therefore, substantially constant with changing values of capacitance.

For response to the potentials developed across the test cell 10 and the variable capacitor 15, a radio frequency amplifier 29 has one input terminal connected via substantially identical resistors 30, 31 to the respective ungrounded terminals of the test cell and the reference capacitor, their other terminals being connected in common to the grounded input terminal of the amplifier 29. The output of amplifier 29 is fed to a rectifier 32 and thence through a phase shifter 33 to a servomotor 35. A winding 36 of the servomotor 35 is energized by a source, such as A.C. line 25, supplying an excitation signal in phase correspondence with the signal supplied by phase shifter 33. By means of drive connection 16, the servomotor 35 is mechanically coupled to the reference capacitor 15 to drive the same degeneratively in accordance with any difference in potential across the test cell and the reference capacitor.

The servomotor 35 may also be coupled, electrically or mechanically, with suitable indicating means such as a recorder 38. The recorder may include a stylus 39 moved in correspondence with adjustment of the variable capacitor 15 and a record 40 engaged by the stylus and advanced, say, as a function of time. If desired, an indication of the balance condition may further be obtained by connecting a cathode ray oscilloscope 44 to the output of rectifier 32.

In many instances, the substance 13 undergoing investigation is of a type having an appreciable conductivity. Accordingly, the test cell may carry an appreciable component of conduction current, as well as the displacement current component which reflects the value of the dielectric constant. Since the resultant of the potentials attributable to these quadrature current components is in excess of a potential due to the displacement current alone, the adjustment of the variable capacitor 15 would be in error by an amount dependent upon the magnitude of the conduction component and thus dependent upon the conductivity of the substance 13 as well as its dielectric constant.

To minimize the consequent inaccuracy, there is provided, in accordance with the invention, a fixed capacitor 42 connected in parallel with the test cell 10 by direct connection of its terminals with the electrodes 11 and 12. Suitably, the capacitance of capacitor 42 is at least of the order of magnitude of the capacitance of the test cell, although the fixed capacitor 42 should have a value somewhat dependent upon the conductivity of the substance 13, as explained hereafter, and larger than the capacitance of the test cell for relatively large conductivities. So that the adjustment of variable capacitor 15 may readily correspond with changes in the capacitance of the test cell 10 with variations in dielectric constant, a fixed capacitor 43 is similarly connected in parallel with the variable capacitor 15 and desirably has substantially the same value of capacitance as capacitor 42.

In an exemplary operation of the system illustrated in FIG. 1, the switch and servomotor are excited by the A.C. line, while the oscillator is turned on to supply radio frequency current via switch 20 alternately to the test cell 13 and the variable capacitor 15. Because the current supplied by oscillator 18 is substantially constant, the total current passed through test cell 13 and fixed capacitor 42 is equal to the total current passed through variable capacitor 15 and fixed capacitor 43.

The potential across the capacitors which, at any instant, are not supplied with current is substantially zero. The potential at the junction of resistors 30, 31 at such instant is, therefore, equal to substantially one-half the potential developed across the other capacitors by flow of current therethrough. As the current is switched from one set of capacitors to the other, the potential at the junction point is modulated at the switching frequency between a value corresponding to the potential across the test cell and a value corresponding to the potential across the variable capacitor. This modulated R.F. potential is amplified and rectified to derive a square wave signal at the switching frequency, as indicated on oscilloscope 44, the sequence of maximum and minimum values of the square wave being dependent upon the sense in which the capacitor 15 requires adjustment for equality with the capacitance of the test cell 10. Since the rectifier 32 is not phase sensitive, the values of the square wave signal correspond with the absolute values or resultant magnitudes of the alternate potentials applied to the amplifier input. To correct for any undesired phase shift of the square wave signal relative to the excitation of the switch 20, a suitable, corrective phase shift is introduced by the phase shifter 33.

Because the servomotor 35 is excited from the same source as the switch 20, its response effectively corresponds to a demodulation of the square wave signal derived from the rectifier 32. That is, its rotation is through a magnitude corresponding to the amplitude of the square wave and in a sense determined by the phase or sequence of maximum and minimum values of the square wave. The sense in which the servomotor 35 is placed in driving connection with the variable capacitor 15 is such that the capacitor 15 assumes a capacitance value equal at any instant to the capacitance of the test cell 10, thereby substantially to nullify the square wave signal supplied to the servomotor. Thus, the variable capacitor 15 is adjusted by the degenerative servo loop in a manner to obtain a forced balance with respect to the capacitance of the test cell. Since the variable capacitor 15 has a calibrated value for any given adjustment, the indications of recorder 38 corresponding to the adjustment are representative of the calibrated value of capacitance and, hence, of the dielectric constant of the substance 13 in the test cell.

Where the substance 13 has an appreciable conductivity, its electrical properties may be represented by an equivalent parallel combination of perfect capacitance $C_x$ and pure resistance R. Then the absolute value of the impedance $Z_1$ of the test cell 10 and fixed capacitor 42 in parallel is given by the relation:

$$(1) \quad |Z_1| = \frac{1}{\sqrt{(C_1+C_x)^2\omega^2 + \left(\frac{1}{R}\right)^2}}$$

where $C_1$ is the capacitance of the fixed capacitor 42 and $\omega$ is the angular frequency (equal to $2\pi f$) of the oscillator 18.

Similarly, the impedance $Z_2$ of the variable capacitor 15 and the fixed capacitor 43 in parallel has an absolute value given by the relation:

$$(2) \quad |Z_2| = \frac{1}{(C_2+C_r)\omega}$$

where $C_2$ is the capacitance of the fixed capacitor 43 and $C_r$ is the capacitance of the variable reference capacitor 15.

So long as the servo feedback loop maintains a null balance, the two impedances $|Z_1|$ and $|Z_2|$ are equal, and we therefore have the relation:

$$(3) \quad \sqrt{(C_1+C_x)^2\omega^2 + \left(\frac{1}{R}\right)^2} = (C_2+C_r)\omega$$

which after reduction, can be written as:

$$(4) \quad C_x = \sqrt{(C_2+C_r)^2 - \left(\frac{1}{R\omega}\right)^2} - C_1$$

As stated above, the values $C_1$ and $C_2$ of the fixed capacitors 42, 43 are preferably equal and of a magnitude which is larger as the conductivity of the substance 13 is larger. It will be appreciated that the conductivity is proportional to the reciprocal of R. More precisely, then, the total capacitance $C_2+C_r$ must be large with respect to the fraction $1/R\omega$. While this relationship can be achieved by increasing the frequency and therefore the value of $\omega$, it is preferable, in accordance with the present invention, to employ frequencies below the megacycle range and to employ sufficiently large fixed capacitors to obtain the desired relationship. When this relationship holds and account is taken of the equality of the fixed capacitances $C_1$ and $C_2$, the expression (4) may be expanded by Maclaurin's series, retaining two terms for a sufficient approximation, as follows:

$$(5) \quad C_x \simeq C_r\left(1 - \frac{(1/R)^2}{2\omega C_r \cdot \omega(C_2+C_r)}\right)$$

Since the indications obtained by the recorder 38 are calibrated in dependence upon values of $C_r$ to represent a measurement of $C_x$, it is clear that the error is directly proportional to the square of the conductivity of the substance 13 and varies inversely as a function of the value $C_2$ of the fixed capacitor 43 (and 42, which is equal). Thus, if the fixed capacitance $C_2$ is four times as great as the capacitance $C_r$ (or $C_x$), the error is reduced to ⅕ the amount which would result in the absence of the fixed capacitors. Hence, more accurate measurements of the test cell capacitance $C_x$ may be obtained reliably without appreciable complication of the apparatus employed.

It will be understood, of course, that the value $C_x$ of the test cell capacitance is directly proportional to the dielectric constant of the substance 13 and that the record 40 may, therefore, be calibrated directly in values of the dielectric constant, if desired.

The system of FIG. 1 is susceptible to widely varying modifications, such as employment of a capacitor-type of single-poled, double-throw switch, or use of a demodulator to obtain an energizing current of reversible polarity for operating a servomotor to drive the variable capacitor. In addition, the switch 20 may be disposed in various different ways, as illustrated in FIGS. 2-4.

Figure 2:
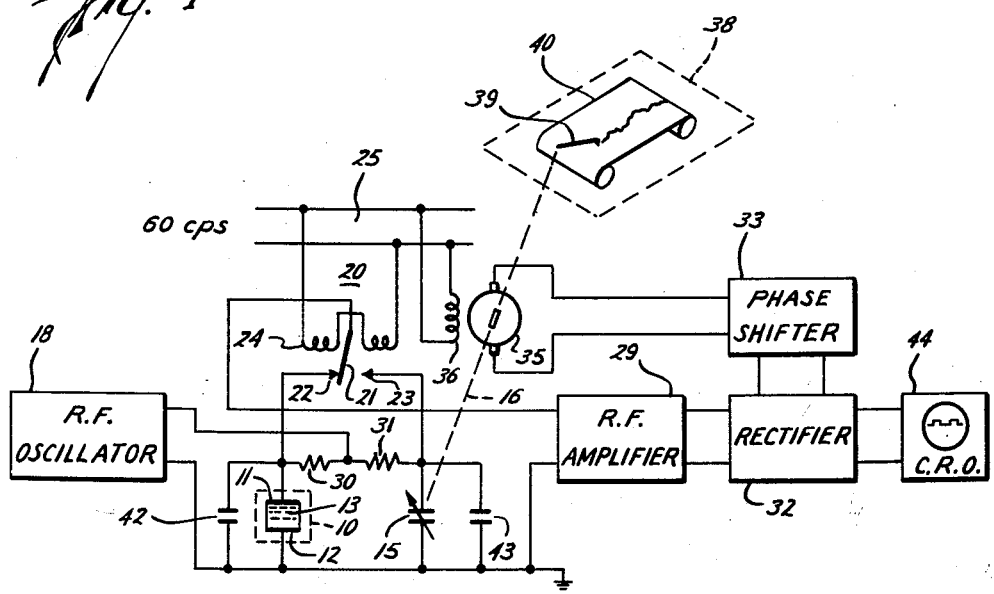
FIG. 2 is a schematic diagram of another embodiment of the invention.

Thus, in FIG. 2, the oscillator 18 is showed connected simultaneously in series with both the test cell 10 and variable capacitor 15 via resistors 30 and 31, respectively, while the test cell and reference capacitor are connected to fixed contacts 22 and 23 of switch 20 for alternate coupling to the input of the amplifier 29.

By employing resistors 30 and 31 of equal relatively high value, such as one megohm, the same total current is supplied to the parallel combination of test cell and fixed capacitor 42 and to the parallel combination of variable capacitor 15 and fixed capacitor 43. Hence, the input to the amplifier 29 is modulated by steps corresponding to any difference in the potentials across the test cell and the variable capacitor, just as in the embodiment of FIG. 1. An advantage is realized in that switch 20 carries no appreciable current but is simply required to switch potentials.

Figure 3:
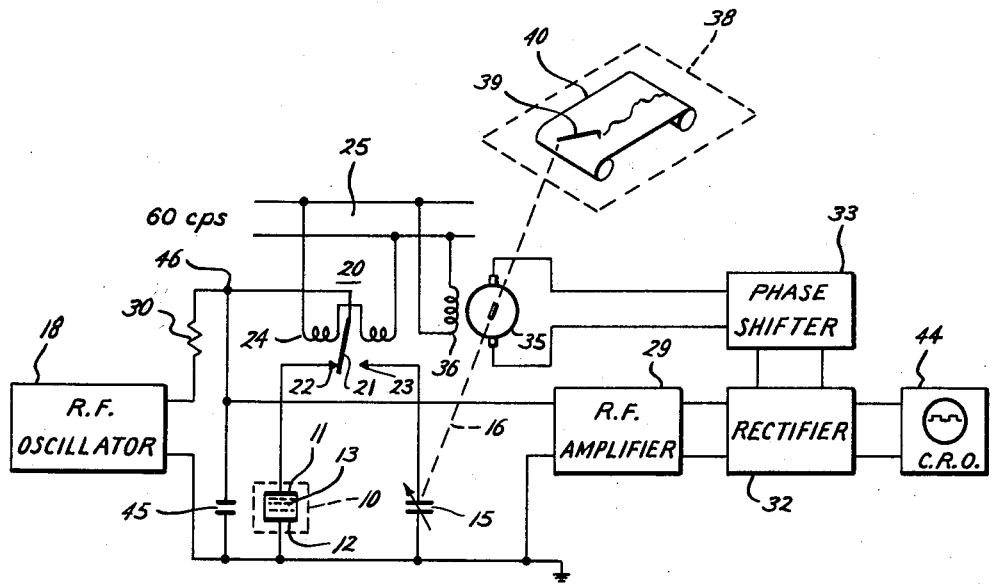
FIG. 3 is a schematic diagram of still another embodiment of the invention.
Figure 4:
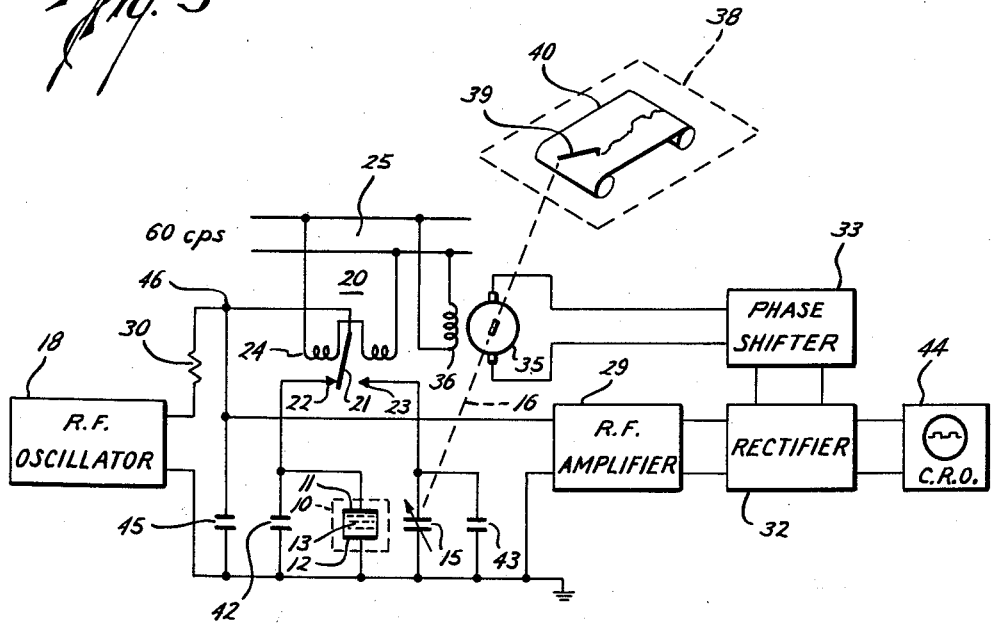
FIG. 4 is a schematic diagram of yet another embodiment of the invention.

In the embodiment of FIG. 3, a single fixed capacitor 45 is alternately connected in parallel with the test cell 10 and the variable capacitor 15 by means of switch 20. To this end, oscillator 18 is connected through single resistor 30 to a common junction point 46 for the movable contact 21 of the switch, a terminal of the fixed capacitor 45, and an input terminal of the amplifier 29. The fixed contacts 22 and 23 of switch 20 are connected to ungrounded terminals of the test cell and variable capacitor, respectively. The grounded terminals of the test cell, the reference capacitor 15 and the fixed capacitor 45 are connected in common with the corresponding terminals of the oscillator and amplifier.

In an exemplary operation of the system of FIG. 3, a constant current is supplied from the oscillator 18 to develop across the fixed capacitor 45 a voltage which alternates between a value determined by parallel connection of the fixed capacitor with the test cell and with the variable capacitor. The potential, thus modulated, is supplied to the input of the amplifier 29 to obtain an operation which is substantially the same as that described above.

As shown in FIG. 4, the single fixed capacitor 45 may be employed as a supplement to fixed capacitors 42 and 43 by a modification of the system illustrated in FIG. 3. This modification consists simply in adding the fixed capacitors 42 and 43 in parallel, respectively, with the test cell 10 and the variable capacitor 15.

The operation of the system of FIG. 4 is substantially identical to that of FIG. 3, the capacitors 42 and 43 simply adding to the total value of fixed capacitance placed in parallel with the test cell and variable capacitor.

It will be apparent that various additional modifications may be made which lie within the purview of the invention. For example, switch 20 may be manually operated and adjustment of variable capacitor 15 may be done by an observer dependent upon the oscilloscope indications. Accordingly, the invention is not to be restricted to the illustrated embodiments but is of a scope defined in the appended claims.

I claim:

1. In apparatus for measuring the dielectric constant of a substance, the combination comprising a test capacitor arranged to receive the substance, a reference capacitor, capacitive means of a given value at least as great as the capacitance of said test capacitor arranged for a connection in respective parallel circuits with each of said test and reference capacitors, means for passing substantially the same current through each of said parallel circuits to produce potentials thereacross, and means responsive to said potentials for providing an indication of the dielectric constant of said substance substantially independent of its conductivity.

2. In apparatus for measuring the dielectric constant of a substance, the combination comprising a test capacitor arranged to receive the substance and having a capacitance dependent upon the dielectric constant of said substance, a variable capacitor, separate fixed capacitors having equal capacitance values at least s great as the capacitance of said test capacitor and connected in parallel with each of said test capacitor and said variable capacitor, impedance means for dividing current from a radio frequency source between said test and variable capacitors to establish potentials thereacross, rectifier means, switch means for alternately coupling the potential across said test capacitor and said variable capacitor with said rectifier means so as to derive a signal having a sequence of values corresponding to the absolute value of said potentials, and means responsive to said signal for adjusting said variable capacitor by an amount representing a function of the dielectric constant of said substance.

3. In apparatus for measuring the dielectric constant of a substance, the combination comprising a test capacitor arranged to receive the substance and having a capacitance dependent upon the dielectric constant of said substance, a variable capacitor arranged in parallel with said test capacitor, a fixed capacitor arranged in parallel with said test capacitor and having a capacitance substantially greater than said test capacitor, means for passing radio, frequency current through said capacitors having a frequency less than one megacycle per second, impedance means connected in series with said test capacitor and said variable capacitor to produce potentials thereacross in response to said radio frequency current, and means responsive to the potentials across said test and variable capacitors for equalizing said potentials by adjusting said variable capacitor by an amount representing a function of the dielectric constant of said substance and independent of the conductivity of said substance.

4. In apparatus for measuring the dielectric constant of a substance, the combination comprising a test capacitor including a pair of electrodes arranged to receive the substance therebetween and having a capacitance dependent upon the dielectric constant of said substance, a variable capacitor arranged in parallel with said test capacitor, a pair of substantially equal fixed capacitors arranged in parallel with said test capacitor and said variable capacitor respectively, said fixed capacitors having a capacitance at least as great as said test capacitor, means for coupling a source of radio frequency current with said capacitors to produce potentials thereacross, and feedback means responsive to the absolute value of the potentials across said test capacitor and across said variable capacitor for adjusting said variable capacitor by an amount representing a function of the dielectric constant of said substance.

5. In apparatus for measuring the dielectric constant of a substance, the combination comprising a test capacitor including a pair of electrodes arranged to receive the substance therebetween and having a capacitance dependent upon the dielectric constant of said substance, a variable capacitor arranged in parallel with said test capacitor, a pair of substantially equal fixed capacitors arranged in parallel with said test capacitor and said variable capacitor respectively, said fixed capacitors having a capacitance at least as great as said test capacitor, means for coupling a source of radio frequency current with said capacitors to produce potentials thereacross, said coupling means including a switch for alternately connecting said test capacitor and said variable capacitor with said current source, and feedback means responsive to the absolute value of the potentials across said test capacitor and across said variable capacitor for adjusting said variable capacitor by an amount representing a function of the dielectric constant of said substance.

6. In apparatus for measuring the dielectric constant of a substance, the combination comprising a test capacitor arranged to receive a substance and having a capacitance dependent upon the dielectric constant of said substance, a variable capacitor, a fixed capacitor, a pair of separate equal capacitors in parallel respectively with said test capacitor and said variable capacitor, the sum of the capacitances of said fixed capacitor and one of said equal capacitors being at least as great as the capacitance of said test capacitor, means for coupling said fixed capacitor with a source of radio frequency current, switch means for alternately connecting said test and variable capacitors in parallel with said fixed capacitor, and means responsive to the absolute value of the potential across said fixed capacitor for adjusting said variable capacitor by an amount representing a function of the dielectric constant of said substance.

7. In apparatus for measuring the dielectric constant of a substance, the combination comprising a test capacitor arranged to receive a substance and having a capacitance dependent upon the dielectric constant of said substance, a variable capacitor, a fixed capacitor having a capacitance at least as great as said test capacitor, means for coupling said fixed capacitor with a source of radio frequency current, switch means for alternately connecting said test and variable capacitors in parallel with said fixed capacitor, and means responsive to the absolute value of the potential across said fixed capacitor for adjusting said variable capacitor by an amount representing a function of the dielectric constant of said substance.

8. In apparatus for measuring the dielectric constant of a substance, the combination comprising a test cell including a pair of electrodes spaced to receive a substance therebetween, a variable capacitor, capacitative means connected in parallel with said variable capacitor and said test cell for increasing the capacitance of each of said variable capacitor and said test cell by a fixed amount, said fixed amount being greater than the capacitance of said test cell, means for passing alternating current through said test cell and said variable capacitor for producing potentials thereacross, means responsive to the difference in potentials across said test capacitor and said variable capacitor for adjusting the capacitance of said variable capacitor substantially to equalize the resultant potentials across said test cell and said variable capacitor, and means responsive to the adjustment of said variable capacitor for providing an indication which is a function of the dielectric constant of said substance.

References Cited in the file of this patent

UNITED STATES PATENTS

| 1,686,365 | Becker | Oct. 2, 1928 |
| 1,932,337 | Dowling | Oct. 24, 1933 |
| 2,457,727 | Rifenbergh | Dec. 28, 1948 |
| 2,476,496 | Kliever | July 19, 1949 |
| 2,485,579 | Elliott | Oct. 25, 1949 |
| 2,623,206 | Hornfeck | Dec. 23, 1952 |
| 2,718,620 | Howe | Sept. 20, 1955 |
| 2,923,881 | Bernet | Feb. 2, 1960 |
| 2,929,986 | Mayes | Mar. 22, 1960 |

FOREIGN PATENTS

| 569,279 | Great Britain | May 16, 1945 |
| 769,806 | Great Britain | Mar. 13, 1957 |